US012595845B2

(12) United States Patent
Debuyser et al.

(10) Patent No.: US 12,595,845 B2
(45) Date of Patent: Apr. 7, 2026

(54) DRIVELINE INCLUDING A HYDRODYNAMIC RETARDER AND METHOD OF OPERATING A HYDRODYNAMIC RETARDER

(71) Applicant: Dana Belgium N.V., Bruges (BE)

(72) Inventors: Christophe Debuyser, Bruges (BE); Kevin Vyncke, Bruges (BE)

(73) Assignee: DANA BELGIUM, Bruges (BE)

( * ) Notice: Subject to any disclaimer, the term of this patent is extended or adjusted under 35 U.S.C. 154(b) by 993 days.

(21) Appl. No.: 17/661,891

(22) Filed: May 3, 2022

(65) Prior Publication Data

US 2022/0356946 A1 Nov. 10, 2022

(30) Foreign Application Priority Data

May 4, 2021 (DE) ..................... 10 2021 204 492.1

(51) Int. Cl.
*F16H 61/48* (2006.01)
*F16H 59/48* (2006.01)
*F16H 59/74* (2006.01)

(52) U.S. Cl.
CPC ............. *F16H 61/48* (2013.01); *F16H 59/48* (2013.01); *F16H 59/74* (2013.01)

(58) Field of Classification Search
CPC ................................ F16H 61/48; F16H 59/74
See application file for complete search history.

(56) References Cited

U.S. PATENT DOCUMENTS

| | | | |
|---|---|---|---|
| 6,910,989 B2 * | 6/2005 | Reisch .................... | B60T 10/02 |
| | | | 188/293 |
| 2008/0004784 A1 * | 1/2008 | Rushing ................ | B60W 10/06 |
| | | | 701/70 |
| 2014/0172260 A1 * | 6/2014 | Scherer ................... | B60T 1/087 |
| | | | 701/70 |

FOREIGN PATENT DOCUMENTS

| | | | | | |
|---|---|---|---|---|---|
| CN | 105083028 A | * | 11/2015 | | |
| DE | 102005021801 A1 | * | 3/2006 | ............. | B60K 6/445 |
| EP | 0784001 A2 | * | 7/1997 | | |
| JP | 201116129 A | * | 4/2001 | | |

* cited by examiner

*Primary Examiner* — Melody M Burch
(74) *Attorney, Agent, or Firm* — McCoy Russell LLP

(57) ABSTRACT

The present document relates to a driveline for a vehicle, the driveline comprising a hydrodynamic retarder, a first driveline component such as a transmission input, and a controller configured to activate the hydrodynamic retarder at a point in time which is determined based on a rotational acceleration of the first driveline component. The present document further relates to a method of controlling a hydrodynamic retarder.

18 Claims, 2 Drawing Sheets

Start

Determine operating conditions 302

304
Transmission input speed ≥ first threshold speed?

No → Sustain current transmission operating strategy 306

Yes

Initiate RT filling 308

310
Transmission input speed ≥ second threshold speed?

No → Sustain current transmission operating strategy 312

Yes

Initiate RT braking 314

End

300

DRIVELINE INCLUDING A HYDRODYNAMIC RETARDER AND METHOD OF OPERATING A HYDRODYNAMIC RETARDER

CROSS-REFERENCE TO RELATED APPLICATION

The present application claims priority to German Patent Application No. 10 2021 204 492.1, entitled "DRIVELINE INCLUDING A HYDRODYNAMIC RETARDER AND METHOD OF OPERATING A HYDRODYNAMIC RETARDER", and filed on May 4, 2021. The entire contents of the above-listed application is hereby incorporated by reference for all purposes.

TECHNICAL FIELD

The present document relates to a driveline including a hydrodynamic retarder and to a method of operating a hydrodynamic retarder.

BACKGROUND AND SUMMARY

Hydrodynamic or hydraulic retarders serve as additional components for braking a vehicle and are usually installed on heavy vehicles such as trucks or buses. They typically include a vaned rotor coupled to a driveline shaft and disposed within a chamber comprising a vaned stator. When the retarder chamber is filled with a liquid such as oil, the liquid exerts a viscous drag on the vaned rotor, thereby providing braking power to the driveline shaft. Usually, the braking power applied to the driveline shaft via the retarder is an increasing function of the liquid pressure and/or of the liquid flow within the retarder chamber. For example, the additional braking power provided by a hydrodynamic retarder may be needed to prevent a vehicle and/or the vehicle engine from overspeeding when the vehicle is driving downhill, for example.

A hydrodynamic or hydraulic retarder may produce an efficient amount of braking power only when the retarder chamber is filled with liquid or when the fill level of the retarder chamber exceeds a threshold fill level. Therefore, depending on the volume of the retarder chamber and the maximum rate at which the retarder chamber can be filled, there may be a significant delay of up to several seconds between activation of the retarder and the point in time at which the retarder starts braking, which may impair efficient speed control and vehicle safety.

Thus, there is demand for a driveline including a hydrodynamic retarder with enhanced speed control.

This problem is solved by a driveline for a vehicle and by a method of operating a hydrodynamic retarder for a vehicle according to the independent claims. Special embodiments are described in the dependent claims.

The presently proposed method of operating a hydrodynamic retarder (RT) for a vehicle comprises the steps of activating the RT at a point in time which is based on or determined based on a rotational acceleration of a first driveline component. As the rotational acceleration of the first driveline component is indicative of a subsequent evolution of a rotational speed of the first driveline component, choosing the activation time of the RT based on this parameter may significantly enhance speed control.

The first driveline component may include a transmission output, for example a transmission output shaft or another rotatable driveline component connected to or drivingly engaged with the transmission output shaft such as a propeller shaft or an axle shaft.

The point in time at which the RT is activated may further be determined based on a first rotational acceleration value or threshold which may be a predetermined value or threshold. For example, the point in time at which the RT is activated may be determined based on a comparison of the rotational acceleration of the first driveline component with the first rotational acceleration threshold, such as based on whether the rotational acceleration of the first driveline component is above or below the first rotational acceleration threshold.

Additionally or alternatively, the point in time at which the RT is activated may be determined based on a comparison of a rotational speed of a second driveline component with a first rotational speed value or threshold which may be a predetermined value or threshold. Typically, the second driveline component is drivingly engaged or drivingly engageable with the first driveline component. For example, the second driveline component may include a transmission input, such as a transmission input shaft or another rotatable driveline component connected to or drivingly engaged with the transmission input shaft. The RT or a rotor of the RT may be connected to or drivingly engaged with the second driveline component.

The RT may be activated when or once the rotational acceleration of the first driveline component is equal to or greater than the first rotational acceleration threshold and, at the same time, the rotational speed of the second driveline component is equal to or greater than the first rotational speed threshold. In this manner, it can be ensured that the RT provides additional braking power early enough to prevent overspeeding.

The second driveline component may be drivingly connected to a vehicle engine and/or other suitable prime mover. The first rotational speed threshold may then be smaller than a second rotational speed value or threshold of the second driveline component corresponding to a no-load governed speed of the vehicle engine. The no-load governed speed of the engine is a predetermined maximum speed which the engine may not exceed when no load is coupled to the engine. The value of the no-load governed speed is typically provided by the manufacturer of the engine. For example, the first rotational speed threshold may be at most 90 percent, at most 80 percent, or at most 70 percent of the second rotational speed value or threshold of the second driveline component corresponding to the no-load governed speed of the vehicle engine. The second rotational speed value or threshold of the second driveline component corresponding to the no-load governed speed of the vehicle engine is the rotational speed at which the second driveline component rotates as the engine rotates at its no-load governed speed, thereby taking into account a drive ratio or gear ratio between the engine and the second driveline component.

The presently proposed method may further comprise increasing a brake power of the RT when or once the rotational speed of the second driveline component is equal to or greater than the second rotational speed value or threshold of the second driveline component corresponding to the no-load governed speed of the vehicle engine. In this case, the brake power of the RT may be increased based on the rotational speed of the above-mentioned second driveline component, for example. Specifically, the brake power of the RT may be increased linearly with the rotational speed of the second driveline component. Increasing the brake power of the RT may include increasing a hydrostatic pressure inside the RT, for example by opening an RT inlet valve and/or by increasing a pressure provided by a source of hydraulic pressure in fluid communication with the RT, such as a pump or a hydraulic cylinder.

The presently proposed method may further comprise de-activating the RT when or once a rotational speed of a second driveline component is smaller than or falls below a rotational speed threshold, or when or once the rotational acceleration of the first driveline component falls below a second rotational acceleration value or threshold which may be a predetermined value or threshold.

The presently proposed method may further comprise reducing a brake power of the RT when or once an RT temperature is within a predetermined range of a predetermined maximum temperature.

The presently proposed driveline comprises: a hydrodynamic retarder, a first driveline component, typically in driving engagement or configured to be in driving engagement with the hydrodynamic retarder, and a controller configured to activate the hydrodynamic retarder at a point in time based on a rotational acceleration of the first driveline component.

The driveline may further include a transmission. The first driveline component may then include a transmission output.

The controller may be configured to determine the point in time at which the retarder is activated based on a first rotational acceleration value or threshold which may be a predetermined value or threshold. For example, the controller may be configured to determine the point in time at which the retarder is activated based on a comparison of the rotational acceleration of the first driveline component with the first rotational acceleration value or threshold.

The driveline may further include a second driveline component. The retarder or a rotor of the retarder may be drivingly engaged with the second driveline component. The second driveline component may include a transmission input. The controller may be configured to determine the point in time at which the retarder is activated based on a comparison of a rotational speed of the second driveline component with a first rotational speed value or threshold which may be a predetermined value or threshold.

The controller may be configured to activate the retarder when or once the rotational acceleration of the first driveline component is equal to or greater than the first rotational acceleration value or threshold, and, at the same time, the rotational speed of the second driveline component is equal to or greater than the first rotational speed value or threshold.

The driveline may further include a vehicle engine. The second driveline component may be drivingly connected to the vehicle engine. The first rotational speed value or threshold may then be smaller than a second rotational speed value or threshold of the second driveline component corresponding to a no-load governed speed of the vehicle engine The controller may be configured to increase a brake power of the retarder when or once the rotational speed of the second driveline component is equal to or greater than the second rotational speed value or threshold of the second driveline component corresponding to the no-load governed speed of the vehicle engine, wherein increasing the brake power of the retarder may include increasing a hydrostatic pressure inside the retarder.

The controller may be configured to increase the brake power of the retarder based on the rotational speed of the second driveline component, for example linearly with the rotational speed of the second driveline component.

The controller may be configured to de-activate the retarder when or once a rotational speed of the second driveline component is smaller than or falls below a rotational speed threshold, or when or once the rotational acceleration of the first driveline component is smaller than or falls below a second rotational acceleration value or threshold which may be a predetermined value or threshold. The second rotational acceleration threshold may be equal to, smaller than or greater than the first rotational acceleration threshold.

The controller may be configured to reduce a brake power of the retarder when or once a retarder temperature is within a predetermined range of a predetermined maximum temperature.

An embodiment of the presently proposed driveline and method of operating a hydrodynamic retarder is explained in the following detailed description with reference to the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
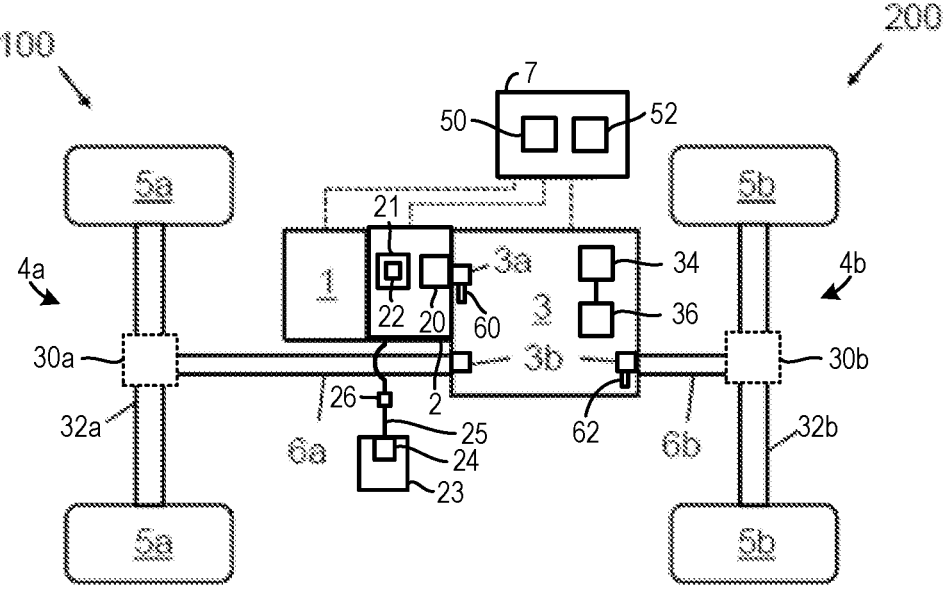
FIG. 1 schematically shows a driveline of the presently proposed type.

FIG. 1 schematically illustrates a vehicle 200 including a driveline 100 of the presently proposed type. The vehicle 200 may be a light, medium, or heavy duty vehicle. The vehicle 200 may be a truck or a bus, for example. The driveline 100 includes a prime mover such as an engine 1, a hydrodynamic retarder (RT) 2, a transmission 3 having an input 3*a* and an output 3*b*, a front axle 4*a* with front wheels 5*a*, a rear axle 4*b* with rear wheels 5*b*, and propeller shafts 6*a*, 6*b* drivingly connecting the transmission 3 with the front axle 4*a* and with the rear axle 4*b*. As such, the vehicle, as illustrated is a four wheel drive wheel. However, two wheel drive vehicle configuration where one propeller shaft rotationally couples the transmission 3 to one of the front axle 4*a* and the rear axle 4*b*. The front axle 4*a* may include a front differential 30*a* and the rear axle 4*b* may include a rear differential 30*b*. The differentials 30*a* and 30*b* are designed to enable speed differentiation between axle shafts 32*a* and 32*b*, respectively. The transmission input 3*a* and output 3 may take the form of a suitable mechanical connection such as shafts, a flanges, combinations thereof, and the like. Further, it will be understood that the transmission input and output are identified in terms of a drive mode in which mechanical power flows from the engine to the transmission, and from the transmission to one or more of the drive axles. However, it will be understood that during other operating conditions, such as coasting, mechanical power may flow from the drive axles to the transmission and then to the engine.

The engine 1 may include a combustion engine such as a diesel engine. However, it is understood that in other embodiments the prime mover may additionally or alternatively include an electric motor, for example. The engine 1 is drivingly engaged with the input 3a of the transmission 3, for example via a single shaft or via a plurality of shafts and gears. However, it is understood that in some embodiments the engine 1 may be connected with the input 3a of the transmission via a torque converter, typically a torque converter with a locking mechanism allowing an input and an output of the torque converter to be mechanically locked to one another. In embodiments where the driveline 100 includes a torque converter and is operated according to the presently proposed method, the torque converter is typically in a locked state.

The RT 2 may be of a generally suitable type. For example, the RT 2 may comprise a vaned rotor 20 coupled to or drivingly engaged with the input 3a of the transmission 3, and a stationary chamber 21 including a vaned stator 22. The RT chamber is usually in fluid communication with a liquid reservoir 23 and with a pump 24 for selectively pumping a liquid such as oil from the liquid reservoir to the RT chamber, or from the RT chamber to the liquid reservoir. One or more fluid lines, conduits, and/or the like, denoted at 25, may be used to establish fluidic communication between the pump 24 and the RT 2. For example, the RT 2 may further include one or more valves 26 for selectively fluidly connecting the RT chamber with the pump and the liquid reservoir, and for selectively fluidly isolating the RT chamber from the pump and the liquid reservoir. As such, the one or more valves 26 may be positioned in the fluid line 25 to allow the flow of fluid between the RT 2 and the reservoir 23 to be modulated. When the RT chamber is filled with liquid, the liquid exerts a viscous drag on the vaned rotor, thereby providing braking power to the transmission 3 and to the axles 4a, 4b, the wheels 5a, 5b and the engine 1 in as far as they are drivingly connected to the transmission 3. Typically, the RT 2 is configured such that it provides braking power to the transmission 3 only when or once a fill level of liquid in the RT chamber is above a predetermined fill level threshold. Therefore, depending on the specific design of the RT 2, in some embodiments once the RT 2 has been activated and liquid is discharged into the RT chamber, it may take up to several seconds until the fill level of liquid discharged into the RT chamber reaches the predetermined fill level threshold and the RT 2 provides braking power to the transmission 3 and possibly to the axles 4a, 4b, the wheels 5a, 5b and the engine 1. The transmission 3 may include a plurality of shafts that may carry gears 34 and clutching devices 36. The clutching devices are designed to operate the transmission in a plurality of gear ratios between the input 3a and the output 3b of the transmission 3. As such, the transmission may be a multi-speed transmission. The clutching devices may include friction type clutches (e.g., wet friction clutches) and/or dog type clutches.

The driveline 100 further includes a controller 7 for controlling the RT 2 and/or other transmission and vehicle components. For instance, the controller may be designed to adjust the clutches in the transmission. The controller 7 may comprise electric circuitry and may include a programmable processing unit such as a microprocessor, an FPGA, or the like. The controller 7 therefore includes a processor 50 and memory 52. The memory 52 is designed to store instructions which are executable by the processor 50 to carry out the control techniques, methods, and the like described herein.

The controller 7 may be configured to control the filling of the RT chamber and the timing of the filling process. Specifically, the controller 7 may be configured to control the activation time of the RT 2, i.e., the point in time at which the filling of the RT chamber commences and liquid is discharged into the RT chamber. For example, the controller 7 may be configured to control the one or more valves which selectively fluidly connect the RT chamber with the pump and the liquid reservoir. Additionally or alternatively, the controller 7 may be configured to control the pump which may pump liquid from the liquid reservoir into the RT chamber, or vice versa. The controller 7 may thus be configured to control the braking power provided by the RT 2 to the input 3a of the transmission 3 by controlling a hydrostatic pressure of the liquid within the RT chamber. The controller 7 may further be configured to control the engine 1, for example an engine speed and/or a torque provided by the engine 1. Here, the controller 7 is further configured to receive a first speed signal or first speed data indicative of a rotational speed of the input 3a of the transmission 3, and to receive a second speed signal or second speed data indicative of a rotational speed of the output 3b of the transmission 3. The controller 7 may further be configured to control a gear shift within the transmission 3, for example by controlling the opening and closing of the clutching devices 36 of the transmission 3.

Figures 2, 3:
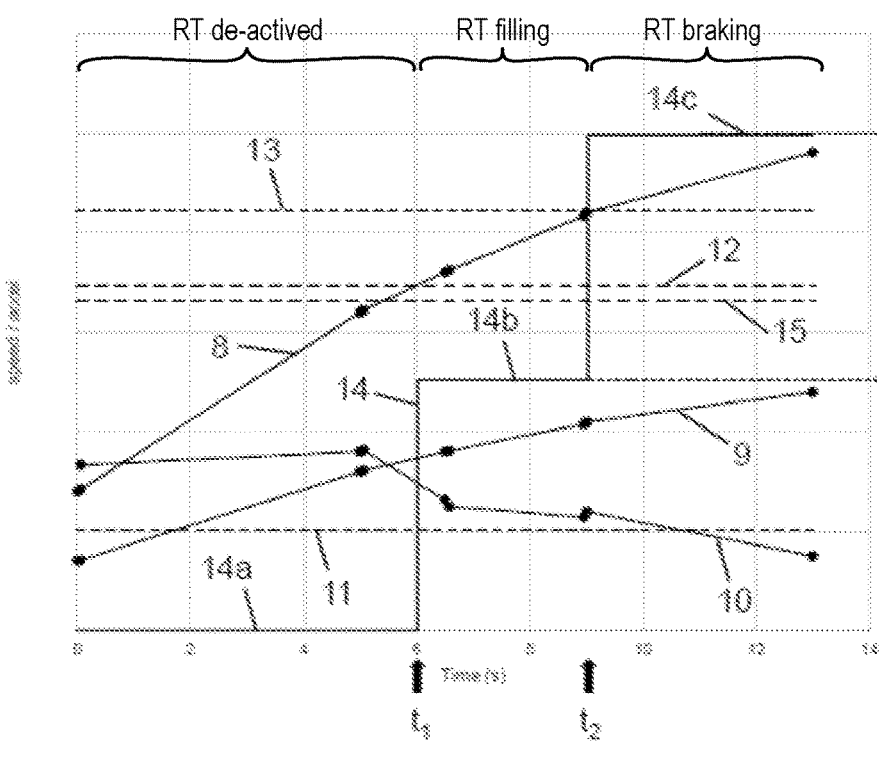
FIG. 2 schematically shows a time sequence of driveline parameters in accordance with the presently proposed method of controlling a hydrodynamic retarder.
FIG. 3 shows a method for operation of a driveline.

FIG. 2 schematically depicts a time sequence of parameters of the driveline 100 in accordance with the presently proposed method of operating the RT 2. FIG. 2 may relate to a situation where the vehicle 200 including the driveline 100 is driving downhill so that the vehicle 200 and the driveline 100 are in danger of overspeeding. Overspeeding of the vehicle 200 may be undesirable. Overspeeding of the driveline 100 may degrade driveline components such as the engine 1 and/or the transmission 3, which may be designed to withstand rotational speeds only up to a certain maximum speed.

Specifically, FIG. 2 illustrates a time sequence 8 of a rotational speed of the input 3a of the transmission 3, a time sequence 9 of a rotational speed of the output 3b of the transmission 3, and a time sequence 10 of an acceleration of the output 3b of the transmission 3. The speed 8 of the transmission input 3a may be measured by a first speed sensor 60, illustrated in FIG. 1, and transmitted to the controller 7. Similarly, the speed 9 of the transmission output 3b may be measured by a second speed sensor 62, illustrated in FIG. 1, and transmitted to the controller 7. The controller 7 may then calculate the acceleration 10 of the transmission output 3b from the time sequence 9 of the transmission output speed, for example. Here, a gear ratio between the engine 1 and the input 3a of the transmission 3 is 1:1 so that the time sequence 8 further represents the rotational speed of the engine 1. It is understood that in alternative embodiments not explicitly depicted here a gear ratio between the engine 1 and the input 3a of the transmission 3 may be different from 1:1.

FIG. 2 further depicts a first rotational acceleration threshold 11 (dashed line), a first rotational speed threshold 12 (dashed line), a second rotational speed threshold 13 (dashed line), and a third rotational speed threshold 15. The second rotational speed threshold 13 is the speed of the transmission input 3a which corresponds to a no-load governed speed of the engine 1, which is drivingly connected to the transmission input 3a. In general, the value of the second rotational speed threshold 13 depends on the no-load governed speed of the engine 1 and the gear ratio between the engine 1 and the transmission input 3a. In the present case where the gear ratio between the engine 1 and the transmission input 3a is 1:1, the value of the second rotational speed threshold 13 is equal to the no-load governed speed of the engine 1. The presently proposed method aims to activate the RT 2 early enough for the RT 2 to provide braking power to the driveline 100 when or once the engine speed exceeds the no-load governed speed of the engine 1.

Finally, FIG. 2 shows a time sequence 14 of a state of the RT 2. At a given time, the state 14 of the RT 2 is one of "de-activated" 14a, "filling" 14b, and "braking" 14c. The state of the RT 2 is "de-activated" when the RT chamber is empty or nearly empty, for example when a fill level of the RT chamber is below a first fill level threshold, and no liquid is discharged into the RT chamber. For instance, the first fill level threshold may be at most 10 percent of the volume of the RT chamber. The state of the RT 2 is "filling" when liquid is discharged into the RT chamber and the fill level of the RT chamber is below a second fill level threshold, wherein the second fill level threshold is higher than the first fill level threshold. For instance, the second fill level threshold may be at least 70 percent, at least 80 percent, or at least 90 percent of the volume of the RT chamber. And the state of the RT 2 is "braking" when the fill level of the RT chamber is above the second fill level threshold.

As the vehicle 200 is driving downhill it is accelerated by gravity, as can be seen by the increasing transmission input and output speed 8 and 9 and the non-zero acceleration 10 of the transmission output 3b. In the situation schematically depicted in FIG. 2, torque is transmitted from the vehicle wheels 5a, 5b of the accelerating vehicle 200 to the transmission 3 and to the engine 1. The proportionality between the curves 8 and 9 indicates that the transmission 3 is in the same gear throughout the time span shown in FIG. 2. For example, the gear ratio between the input 3a and the output 3b of the transmission 3 may be selected automatically by the controller 7, or it may be selected manually by an operator of the vehicle 200.

The controller 7 monitors or continuously monitors the transmission input speed 8 and compares its value with the first rotational speed threshold 12. For instance, the controller 7 checks or continuously checks whether the transmission input speed 8 is equal to or above the first rotational speed threshold 12. And the controller 7 monitors or continuously monitors the transmission output acceleration 10 and compares its value with the first rotational acceleration threshold 11. For instance, the controller 7 checks or continuously checks whether the transmission output acceleration 10 is equal to or above the first rotational acceleration threshold 11.

When or once the transmission input speed 8 is equal to or above the first rotational speed threshold 12, and, at the same time, the transmission output acceleration 10 is equal to or above the first rotational acceleration threshold 11, as at the point in time $t_1$ in FIG. 2, the controller 7 activates the RT 2, for example by opening a valve which fluidly connects the RT chamber with a liquid reservoir via a pump. A value of the first rotational speed threshold 12 is smaller than a value of the second rotational speed threshold 13. That is, the controller 7 activates the RT 2 before the transmission input speed 8 reaches the second rotational speed threshold 13 which is equal to the rotational speed at which the transmission input 3a turns or rotates as the engine 1 turns or rotates at its no-load governed speed.

At the point in time $t_1$, the state of the RT 2 transitions from "de-activated" to "filling", as indicated by the step-like increase in the RT state sequence 14 at $t_1$. The values of the first rotational speed threshold 12 and of the first rotational acceleration threshold 11 may be chosen such that once the transmission input speed 8 exceeds the first rotational speed threshold 12 and the transmission output acceleration 10 exceeds the first rotational acceleration threshold 11, immediate activation of the RT 2 allows the RT 2 to provide braking power to the driveline 100 before, when or just after the transmission input speed 8 reaches the second rotational speed threshold 13 corresponding to the no-load governed speed of the engine 1. For example, the controller 7 may be configured to adapt the values of one or more of the first rotational speed threshold 12, the third rotational speed threshold 15 and the first acceleration threshold 11 based on a current gear ratio between the input 3a and the output 3b of the transmission and/or based on the payload of the vehicle 200.

At the point in time $t_2$ in FIG. 2 the fill level of the RT chamber exceeds the second fill level threshold, the RT state 14 transitions from "filling" 14b to "braking" 14c, and the RT 2 provides braking power to the driveline 100, as indicated by the step-like increase in the RT state sequence 14 at $t_2$. As can be further observed in FIG. 2, the RT 2 starts providing braking power to the driveline 100 when or once or just after the transmission input speed 8 reaches or exceeds the second rotational speed threshold 13 corresponding to the no-load governed speed of the engine 1.

When or once or as long as the rotational speed 8 of the of the transmission input 3a is equal to or greater than the second rotational speed threshold 13, for example from the point in time $t_2$ onward, the controller 7 may increase the brake power of the RT 2, for example linearly with the rotational speed 8 of the transmission input 3a. For instance, the controller 7 may increase the brake power of the RT 2 by increasing the hydrostatic pressure inside the RT chamber. However, the controller 7 may further be configured to reduce the brake power provided by the RT 2 or to keep the brake power provided by the RT 2 below a predetermined maximum brake power when or once or as long as a retarder temperature is within a predetermined range of a predetermined maximum temperature.

When the RT 2 is in the "filling" state 14b, the controller 7 may be configured to de-activate the RT 2 by draining the RT chamber below the first fill level threshold when or once the rotational acceleration 10 of the transmission output 3b is or falls below a second rotational acceleration threshold, wherein the second rotational acceleration threshold may be equal to, greater than or smaller than the first rotational acceleration threshold 11 described above. Additionally or alternatively, when or once the filling of the RT 2 has been completed so the RT 2 transitions to the "braking" state 14c or the RT 2 is about to transition to the "braking" state 14c, the controller 7 may be configured to de-activate the RT 2 by draining the RT chamber below the first fill level threshold if it turns out that upon completion of the filling process the rotational speed 8 of the transmission input 3a has not reached the second rotational speed threshold 13 corresponding to the no-load governed speed of the engine 1.

And when the RT 2 is in the "braking" state 14c, the controller 7 may be configured to de-activate the RT 2 by draining the RT chamber below the first fill level threshold when or once the rotational speed 8 of the transmission input 3a is smaller than or falls below a third rotational speed threshold 15. In the embodiment depicted in FIG. 2 a value of the third rotational speed threshold 15 is smaller than the value of the first rotational speed threshold 12. However, it is understood that in alternative embodiments not explicitly depicted here the value of the third rotational speed threshold 15 may be equal to or greater than the value of the first rotational speed threshold 12. Typically, the absolute value of a difference between the value of the third rotational speed threshold 15 and the value of the first rotational speed threshold 12 is at most 20 percent, at most 10 percent, or at most 5 percent of the value of the first rotational speed threshold 12.

FIG. 3 shows a method 300 for operation of a driveline. The method 300 may be carried out by any of the drivelines or combinations of the drivelines described herein with regard to FIGS. 1-2. However, the method 300 may be carried via other suitable drivelines, in other examples. Furthermore, the method 300 may be implemented by a controller that includes a processor and memory, as previously discussed.

At 302, the method includes determining operating conditions. The operating conditions may include transmission input speed, transmission output speed, transmission output acceleration, vehicle speed, ambient temperature, and the like. The operating conditions may be ascertained via sensor inputs, modeling, look-up tables, and/or other suitable techniques.

Next at 304, the method includes judging if the transmission input speed is greater than or equal to a first threshold speed. Further, in one example, step 304 may additional judge if the acceleration of the transmission's output is greater than a first threshold value. The first speed threshold may be determined based on an upper desirable speed (e.g., maximum speed) of the engine or other prime mover coupled to the transmission. For instance, the first speed threshold may be indicative of the transmission input approaching the upper desirable speed.

If it is determined that the transmission input speed is not greater than or equal to the first threshold speed (NO at 304) and the transmission's output acceleration is not greater than the acceleration threshold, in some circumstances, the method proceeds to 306. At 306, the method includes sustaining the transmission's current operating strategy. For instance, the RT may be sustained in a de-activated configuration. After 306, the method returns to 302.

Conversely, if it is determined that the transmission input speed is greater than or equal to the first threshold speed (YES at 304) and the transmission's output acceleration is greater than the first acceleration threshold, in some circumstances, the method proceeds to 308. At 308, the method includes initiating RT filling. For instance, the valve which adjusts the fluid flow to the RT may opened to allow the RT chamber to be filled to a desired range (e.g., 10%-70% of maximum fill, in one use-case example).

At 310, the method includes judging if the transmission input speed is greater than a second threshold speed. The second threshold speed is greater than the first threshold speed and may be the engine's upper speed threshold (e.g., maximum speed).

If it is judged that the transmission input speed is not greater than second threshold speed (NO at 310) the method moves to 312 where the method includes sustaining the current transmission operating strategy. For instance, RT filling may be sustained. However, if the transmission output acceleration falls below a second threshold value, filling of the RT may be discontinued and the method may end, in one example.

If it is judged that the transmission input speed is greater than second threshold speed (YES at 310) the method moves to 314 where the method includes initiating RT braking. For instance, the RT may be filled such that is surpasses the filling range. For instance, the RT may be filled to a value that is greater than 70%, in one use-case example. Method 300, enables the RT to be filled in anticipation of the transmission input reaching an upper threshold speed, to reduce delays in RT braking. Consequently, the likelihood of transmission degradation is decreased.

The description herein provides for a driveline operating method that includes filling a hydrodynamic retarder that is rotationally coupled to a transmission in direct response to an input speed of the transmission exceeding a first threshold speed and an acceleration of an output of the transmission exceeding a threshold acceleration; and transitioning from filling of the hydrodynamic retarder to braking the hydrodynamic retarder in direct response to the input speed of the transmission exceeding a second threshold speed that is greater than the first threshold speed.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware in combination with the electronic controller. As such, the described actions, operations, and/or functions may graphically represent code to be programmed into non-transitory memory of the computer readable storage medium in the transmission and/or vehicle system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

The foregoing description is considered as illustrative only of the principles of the described embodiments. Further, since numerous modifications and changes will readily occur to those skilled in the art, it is not desired to limit the described embodiments to the exact construction and processes shown and described herein. Accordingly, all suitable modifications and equivalents may be considered as falling within the scope of the described embodiments as defined by the claims which follow.

The invention claimed is:

1. A method of operating a hydrodynamic retarder for a vehicle, the method comprising:
    activating the hydrodynamic retarder at a point in time which is determined based on a rotational acceleration of a first driveline component;
    wherein the point in time at which the hydrodynamic retarder is activated is further determined based on a comparison of a rotational speed of a second driveline component with a first rotational speed threshold, wherein the second driveline component includes a transmission input.

2. The method of claim 1, wherein the first driveline component includes a transmission output.

3. The method of claim 1, wherein the point in time at which the hydrodynamic retarder is activated is further determined based on a first rotational acceleration threshold.

4. The method of claim 3, wherein the point in time at which the hydrodynamic retarder is activated is determined based on a comparison of the rotational acceleration of the first driveline component with the first rotational acceleration threshold.

5. The method of claim 1, wherein the hydrodynamic retarder is drivingly engaged with the second driveline component.

6. The method of claim 1, wherein the hydrodynamic retarder is activated when or once the rotational acceleration of the first driveline component is equal to or greater than a first rotational acceleration threshold, and the rotational speed of the second driveline component is equal to or greater than the first rotational speed threshold.

7. The method of claim 6, wherein the second driveline component is drivingly connected to a vehicle engine and the first rotational speed threshold is smaller than a second rotational speed threshold which is equal to a rotational speed of the second driveline component corresponding to a no-load governed speed of the vehicle engine.

8. The method of claim 7, further comprising increasing a brake power of the hydrodynamic retarder when or once the rotational speed of the second driveline component is equal to or greater than the second rotational speed threshold, wherein increasing the brake power of the hydrodynamic retarder includes increasing a hydrostatic pressure inside the hydrodynamic retarder.

9. The method of claim 8, wherein the brake power of the retarder is increased based on the rotational speed of the second driveline component, linearly with the rotational speed of the second driveline component.

10. The method of claim 1, further comprising de-activating the hydrodynamic retarder when or once a rotational speed of the second driveline component is smaller than or falls below a rotational speed threshold, or when or once the rotational acceleration of the first driveline component is or falls below a rotational acceleration threshold.

11. The method of claim 1, further comprising reducing a brake power of the hydrodynamic retarder when or once a retarder temperature is within a predetermined range of a predetermined maximum temperature.

12. The method of claim 1, wherein:
the point in time is further determined based on a rotational speed of the second driveline component; and
the first driveline component is a transmission output and the second driveline component is the transmission input.

13. A driveline, comprising:
a hydrodynamic retarder;
a first driveline component coupled to the hydrodynamic retarder;
a second driveline component, wherein the controller is configured to activate the hydrodynamic retarder when or once the rotational acceleration of the first driveline component is equal to or greater than a first rotational acceleration threshold and a rotational speed of the second driveline component is equal to or greater than a first rotational speed threshold; and
a controller configured to activate the hydrodynamic retarder at a point in time which is determined based on a rotational acceleration of the first driveline component.

14. The driveline of claim 13, wherein the first driveline component includes a transmission output.

15. The driveline of claim 13, wherein the second driveline component includes a transmission input.

16. The driveline of claim 15, wherein:
the point in time is further determined based on a rotational speed of the second driveline component;
the first driveline component is an output of a transmission and the second driveline component is the transmission input; and
the transmission is a multi-speed transmission.

17. The driveline of claim 13, further comprising a vehicle engine drivingly connected to the second driveline component, wherein the first rotational speed threshold is smaller than a second rotational speed threshold which is equal to a rotational speed of the second driveline component corresponding to a no-load governed speed of the vehicle engine.

18. A driveline operating method comprising:
filling a hydrodynamic retarder that is rotationally coupled to a transmission in direct response to an input speed of the transmission exceeding a first threshold speed and an acceleration of an output of the transmission exceeding a threshold acceleration; and
transitioning from filling of the hydrodynamic retarder to braking operation of the hydrodynamic retarder in direct response to the input speed of the transmission exceeding a second threshold speed that is greater than the first threshold speed.

* * * * *